US011741186B1

United States Patent
Frikha et al.

(10) Patent No.: US 11,741,186 B1
(45) Date of Patent: Aug. 29, 2023

(54) DETERMINING ZONE TYPES OF A WEBPAGE

(71) Applicant: Content Square SAS, Paris (FR)

(72) Inventors: Slim Frikha, Paris (FR); Mohamed-Amine Baatout, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/877,672

(22) Filed: Jul. 29, 2022

Related U.S. Application Data

(60) Provisional application No. 63/336,722, filed on Apr. 29, 2022.

(51) Int. Cl.
| | |
|---|---|
| G06F 16/958 | (2019.01) |
| H04L 67/50 | (2022.01) |
| G06F 17/00 | (2019.01) |
| G06F 11/34 | (2006.01) |

(52) U.S. Cl.
CPC ........ *G06F 16/986* (2019.01); *G06F 11/3476* (2013.01); *H04L 67/535* (2022.05)

(58) Field of Classification Search
CPC ... G06F 16/986; G06F 11/3476; H04L 67/535
USPC ........................................................ 715/234
See application file for complete search history.

(56) References Cited

U.S. PATENT DOCUMENTS

2017/0053208 A1* 2/2017 Krishnamurthy ...... G06N 5/022

OTHER PUBLICATIONS

Xiang Deng et al., DOM-LM: Learning Generalizable Representations for HTML Documents, Published Jan. 25, 2022 via arXiv, pp. 1-11 (pdf).*
Yichao Zhou et al., Simplified DOM Trees for Transferable Attribute Extraction from the Web, Published Jan. 7, 2021 via arXiv, pp. 1-10 (pdf).*
Kilho Shin et al., Learning DOM Trees of Web Pages by SUbpath Kernel and Detecting Fake e-Commerce Sites, Published Jan. 14, 2021 via mdpi.com, pp. 1-28 (pdf).*
Nichita Utiu et al., Learning Web Content Extraction with DOM Features, Published 2018 via IEEE, pp. 1-8 (pdf).*

* cited by examiner

*Primary Examiner* — Manglesh M Patel
(74) *Attorney, Agent, or Firm* — Schwegman Lundberg & Woessner, P.A.

(57) ABSTRACT

Aspects of the present disclosure involve a system comprising a computer-readable storage medium storing a program and method for determining zone types of a webpage. The program and method provide for generating, for at least one node a first webpage, a vector including HTML content corresponding to the at least one node; providing the vector as input to a machine learning model configured to output a predicted node type based on the vector, the machine learning model having been trained with plural vectors including HTML content corresponding to plural nodes of second webpages; and determining, based on the output of the machine learning model, the predicted node type of the vector, to classify the at least one node.

18 Claims, 12 Drawing Sheets

US 11,741,186 B1

DETERMINING ZONE TYPES OF A WEBPAGE

CLAIM OF PRIORITY

This application claims the benefit of U.S. Provisional Application No. 63/336,722, filed Apr. 29, 2022, which is hereby incorporated by reference in its entirety.

TECHNICAL FIELD

The present disclosure relates generally to web session analysis, including determining zone types of a webpage.

BACKGROUND

Web analysis solutions provide for the collection and analysis of website data. Such solutions may provide for capturing user interaction with respect to webpage visits.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Web analysis solutions provide for the collection and analysis of website data. Example web analysis tools include the tracking and recording of session events corresponding to user interactions, automated website zone identification, session replay, statistical analysis of collected data, and the like.

A given webpage may include multiple zones or elements. However, the variety of ways in which various zones or elements can be arranged may reduce the ability of a site administrator to easily and quickly understand the content and arrangement of a webpage.

The disclosed embodiments provide an experience analytics system configured to automatically determine zone types of a webpage, based on machine learning. For webpages, the exact tree structure is provided to the machine learning model without additional information summarization. For nodes within pages, the corresponding HTML code snippet of the webpage is used to generate vectors for training the machine learning model. As such, the model training may be page category agnostic and zone type agnostic. Given a different dataset, different zone types and different page categories, reduced effort (or no additional effort) may be needed for training a new machine learning model on a new set of zone types and page categories.

Thus, the disclosed embodiments provide for generating, for node(s) of a first webpage, a vector HTML content (e.g., from an HTML code snippet) corresponding to the node(s). The vector is provided as input to a machine learning model. The machine learning model is configured to output a predicted node type based on the vector, the machine learning model having been trained with multiple vectors including HTML content corresponding to plural nodes of second webpages. Based on the output of the machine learning model, the predicted node type of the vector is determined, to classify the at least one node.

Networked Computing Environment

Figure 1:
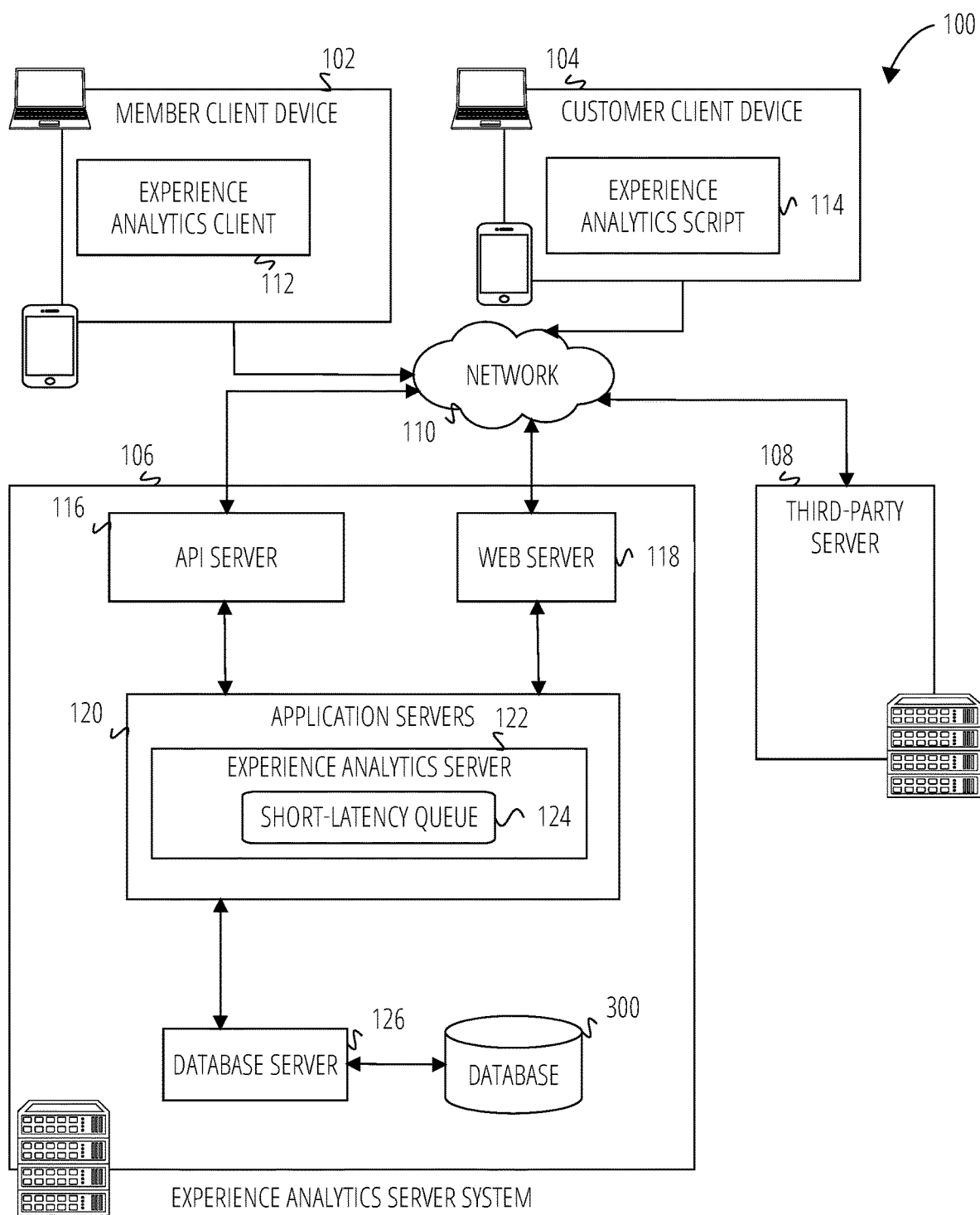
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 104, and multiple instances of a third-party server 108.

The member client device 102 is associated with a client of the experience analytics system 100, where the client that has a website hosted on the client's third-party server 108. An agent of the client (e.g., a web administrator, an employee, an operator, etc.) can be the user of the member client device 102.

Each of the member client devices 102 hosts a number of applications, including an experience analytics client 112. Each experience analytics client 112 is communicatively coupled with an experience analytics server system 106 and third-party servers 108 via a network 110 (e.g., the Internet). An experience analytics client 112 can also communicate with locally-hosted applications using Applications Program Interfaces (APIs).

The member client devices 102 and the customer client devices 104 can also host a number of applications including Internet browsing applications (e.g., Chrome, Safari, etc.).

The experience analytics client 112 can also be implemented as a platform that is accessed by the member client device 102 via an Internet browsing application or implemented as an extension on the Internet browsing application.

Users of the customer client device 104 can access client's websites that are hosted on the third-party servers 108 via the network 110 using the Internet browsing applications. For example, the users of the customer client device 104 can navigate to a client's online retail website to purchase goods or services from the web site.

The third-party server 108 may include data relating to websites, data relating to webpages, other, like, data, and any combination thereof. The third-party server 108 may be a local web source(s), remote web source(s), or any combination thereof, including a cloud-based network(s), distributed network(s), and the like. Examples of the third-party server 108 include, but are not limited to, repositories of webpage information, repositories of webpage element or zone information, servers configured to provide "live" webpages, other, like, sources, and any combination thereof.

While a user of the customer client device 104 is navigating a client's website on an Internet browsing application, the Internet browsing application on the customer client device 104 can also execute a client-side script (e.g., JavaScript (.*js)) such as an experience analytics script 114. In one example, the experience analytics script 114 is hosted on the third-party server 108 with the client's website and processed by the Internet browsing application on the customer client device 104. The experience analytics script 114 can incorporate a scripting language (e.g., a .*js file or a .json file).

In certain examples, a client's native application (e.g., ANDROID™ or IOS™ Application) is downloaded on the customer client device 104. In this example, the client's native application including the experience analytics script 114 is programmed in JavaScript leveraging a Software Development Kit (SDK) provided by the experience analytics server system 106. The SDK includes Application Programming Interfaces (APIs) with functions that can be called or invoked by the client's native application.

In one or more embodiments, the experience analytics script 114 is configured to collect activity relating to a client's interaction with the third-party server 108 content through a webpage displayed on the customer client device 104. In one example, the experience analytics script 114 records data including the changes in the interface of the webpage being displayed on the customer client device 104, the elements on the webpage being displayed or visible on the interface of the customer client device 104, the text inputs by the user into the webpage, a movement of a mouse (or touchpad or touch screen) cursor, user scrolls, and mouse (or touchpad or touch screen) clicks on the interface of the webpage. In addition, and with proper user permissions, the experience analytics script 114 may be configured to collect activity data features including, customer client device 104 type, website/application type, customer client device 104 geolocation, customer client device 104 internet protocol (IP) address, uniform resource locators (URLs) accessed by the customer client device 104, customer client device 104 screen resolution, and/or referrer URLs.

The experience analytics script 114 transmits the data to the experience analytics server system 106 via the network 110. In another example, the experience analytics script 114 transmits the data to the third-party server 108 and the data can be transmitted from the third-party server 108 to the experience analytics server system 106 via the network 110. As such, the experience analytics script 114 is configured to collect activity relating to a client's interaction with web server content (e.g., content from the third-party server 108) through a webpage displayed on the customer client device 104.

In one or more embodiments, the experience analytics script 114 may be included within the source code of a webpage, such as the hypertext markup language (HTML) code underlying such a webpage, where such source code is hosted by the third-party server 108 (e.g., web server). Where a user of the customer client device 104 connects to the third-party server 108 and requests to visit a given webpage, the underlying code for the webpage is downloaded to the customer client device 104 and rendered thereupon, including the experience analytics script 114, providing for user interaction with the webpage, as well as for data collection by the experience analytics script 114.

In one or more embodiments, the member client device 102 includes an experience analytics client 112. The experience analytics client 112 is a platform, program, service, or the like, configured to provide help agents, and the like, with the ability to view details of a live session. For example, the experience analytics client 112 is configured to provide user interfaces to display one or more features of a live session, including, without limitation, live session events, historical replay data, and the like, as well as any combination thereof. The experience analytics client 112 may be configured to provide a help agent with a unique per-session view, the unique per-session view corresponding to a single user's current session. The experience analytics client 112 may be configured to provide the unique view upon the help agent's activation of a unique link (e.g., a live session link), where such a unique link may be sent to the member client device 102 upon a user's interaction with a "live support" or similar button or feature, as may be included in a webpage which a user is visiting on the customer client device 104.

The experience analytics client 112 may be further configured to identify, based on the contents of the unique link, one or more relevant live replay data features including, without limitation, live session events, historical recorded events, and the like, and to collect, receive, or otherwise access such data features. Specifically, the experience analytics client 112 may be configured to access live session events by opening a connection to a short-latency queue (SLQ) 124.

In addition, the experience analytics client 112 may be configured to collect or receive data relevant to one or more previous sessions including, as examples and without limitation, session replays, session replay analytics, and the like. The experience analytics client 112 may be configured to provide for collection, receipt, or the like, of such data, as may be relevant to such previous sessions, from one or more sources including, without limitation, the database 300, and the like, as well as any combination thereof.

Following collection, receipt, or the like, of live and historical session data, the experience analytics client 112 provides for displaying user interface(s) with one or more of such data features to a help agent, providing for agent review of current and historical session data. Such presentation, through the member client device 102, provides for short-term view of session data combined with long-term persistent view of session data. In this regard, data exchanged between the experience analytics client 112 and the experience analytics server system 106 may include functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 106 supports various services and operations that are provided to the experience analytics client 112. Such operations include transmitting data to and receiving data from the experience analytics client 112. Data exchanges to and from the experience analytics server system 106 are invoked and controlled through functions available via user interfaces (UIs) of the experience analytics client 112.

The experience analytics server system 106 provides server-side functionality via the network 110 to a particular experience analytics client 112. While certain functions of the experience analytics system 100 are described herein as being performed by either an experience analytics client 112 or by the experience analytics server system 106, the location of certain functionality either within the experience analytics client 112 or the experience analytics server system 106 may be a design choice. For example, it may be technically preferable to initially deploy certain technology and functionality within the experience analytics server system 106 but to later migrate this technology and functionality to the experience analytics client 112 where a member client device 102 has sufficient processing capacity.

Turning now specifically to the experience analytics server system 106, an Application Program Interface (API) server 116 is coupled to, and provides a programmatic interface to, application servers 120. The application servers 120 are communicatively coupled to a database server 126, which facilitates access to a database 300 that stores data associated with experience analytics processed by the application servers 120. Similarly, a web server 118 is coupled to the application servers 120, and provides web-based interfaces to the application servers 120. To this end, the web server 118 processes incoming network requests over the Hypertext Transfer Protocol (HTTP) and several other related protocols.

The Application Program Interface (API) server 116 receives and transmits message data (e.g., commands and message payloads) between the member client device 102 and the application servers 120. Specifically, the Application Program Interface (API) server 116 provides a set of interfaces (e.g., routines and protocols) that can be called or queried by the experience analytics client 112 or the experience analytics script 114 in order to invoke functionality of the application servers 120. The Application Program Interface (API) server 116 exposes to the experience analytics client 112 various functions supported by the application servers 120, including generating information on errors, insights, merchandising information, adaptability information, images, graphs providing visualizations of experience analytics, session replay videos, zoning and overlays to be applied on the website, etc.

The application servers 120 host a number of server applications and subsystems, including for example an experience analytics server 122. The experience analytics server 122 implements a number of data processing technologies and functions, particularly related to the aggregation and other processing of data including the changes in the interface of the website being displayed on the customer client device 104, the elements on the website being displayed or visible on the interface of the customer client device 104, the text inputs by the user into the website, a movement of a mouse (or touchpad) cursor and mouse (or touchpad) clicks on the interface of the website, etc. received from multiple instances of the experience analytics script 114 on customer client devices 104. The experience analytics server 122 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 122, in view of the hardware requirements for such processing.

In one or more embodiments, the experience analytics server 122 is configured to execute instructions for streaming live sessions (e.g., live browsing sessions). As is relevant to the execution of instructions for streaming live sessions, live sessions are real-time or near-real-time representations of user journeys through a webpage or set of webpages, including the users' interactions therewith.

The experience analytics server 122 may be configured to activate a "live mode" or other, similar, program, routine, or the like, in response to the receipt, collection, or the like, of one or more "live mode" trigger commands, instructions, or the like, as may be sent by the experience analytics script 114, as described above. Such "live mode" routines may include, without limitation, increasing session event processing frequency, initiating one or more post-to-SLQ processes, such as may be applicable to the population of the short-latency queue (SLQ) 118 with live replay events and data, and the like.

The SLQ 124 may provide for collection, receipt, or the like, of session events, including session events in the order of collection or receipt. The SLQ 124 is a memory, storage, or other, like, component, configured to provide real-time or near-real-time storage of session events, such as clicks, scrolls, text entries, and the like, in the order in which such session events are generated during a user's session, as well as subsequent retrieval or transmission of such stored events, including in order, in real-time or near-real-time, as described hereinbelow. The SLQ 124 may be configured as a virtual component, as a physical component, or in a hybrid physical-virtual configuration.

In one or more embodiments, the database 300 is configured to archive data permanently or semi-permanently. The database 300 may be configured to store information received from one or more web third-party servers 108 (e.g., based on a request from the experience analytics server 122 to the third-party servers 108 for information, such as webpage content), customer client devices 104, and other, like, components, as well as to store data relevant to the operation of the experience analytics server 122 and any outputs therefrom. The database 300 may be a local system, a remote system, or a hybrid remote-local system. Further, the database 300 may be configured as a fully-physical system, including exclusively physical components, as a virtualized system, including virtualized components, or as a hybrid physical-virtual system. Examples of devices which may be configured as a database 300 in the experience analytics system 100 include, without limitation, local database hardware, cloud storage systems, remote storage servers, other, like, devices, and any combination thereof. Further, the database 300 may be directly connected to the experience analytics server 122, such as without an intermediate connection to the network 110, including via connections similar or identical to those described with respect to the network 110.

In one or more embodiments, the database 300 may be configured to store or otherwise archive data relating to one or more sessions, including, without limitation, user interactions, user sessions, other, like, data, and any combination thereof. Further, the database 300 may be configured to transfer, to and from the experience analytics server 122, data necessary for the execution of the methods described herein, and may store or otherwise archive experience analytics server 122 inputs, experience analytics server 122 outputs, or both.

As an example of a potential use-case involving the experience analytics system 100, as may be relevant to the descriptions provided herein, a user may attempt to access a website to purchase a product. The user may, through the customer client device 104, and a browser app included therein, generate a request to access the website. The request, when received by the third-party server 108, may configure the third-party server 108 to send a copy of webpage(s) of the web site to the customer client device 104, including the experience analytics script 114. The database 300 may store a copy of the webpage(s) from the third-party servers 108 (e.g., based on a request from the experience analytics server 122 to the third-party servers 108). The experience analytics server 122 may provide such copy to the customer client device 104. During the course of the customer client's session, the experience analytics script 114 may collect session data and transmit such data to the experience analytics server 122 for storage in the database 300.

In addition, where the user at the customer client device 104 encounters an issue (e.g., an error such a defective checkout button, user confusion, and/or another type of issue), the user may engage a live help support feature (e.g., implemented by the experience analytics server 122), for example, by selecting a chat button. In this regard, the help support feature includes a chat component, which allows a support agent at the member client device 102 to chat with the user at the customer client device 104. Moreover, the help support feature allows the user to connect with the help agent, causing the experience analytics script 114 to employ a script interface (e.g., a Javascript API) to make data available for the member client device 102 (e.g., such that when the live session link/button is pressed, this data is visible to the agent), and to send a live mode trigger to the experience analytics server system 106. Following receipt of the live mode trigger by the experience analytics server system 106, the user's session data may be pushed to the SLQ 124 of the experience analytics server 122, in real-time or near-real-time. The experience analytics server 122 sends the live session link to the member client device 102, where the live session link is selectable by the help agent.

Following a help agent's activation of the live session link, the experience analytics server 122 may be configured to provide live session replay to the member client device 102. For example, the experience analytics server 122 generates a combined SLQ 124 and database 300 data feed, and provides the combined data feed to the help agent at the member client device 102, in real-time or near-real-time, permitting the help agent to view the user's live session, and provide suggestions regarding how the user can better engage with the website. The merging allows the help agent to seek back (e.g., rewind) to view what happened, even before the web site visitor at the customer client device 104 pressed the chat button.

System Architecture

Figure 2:
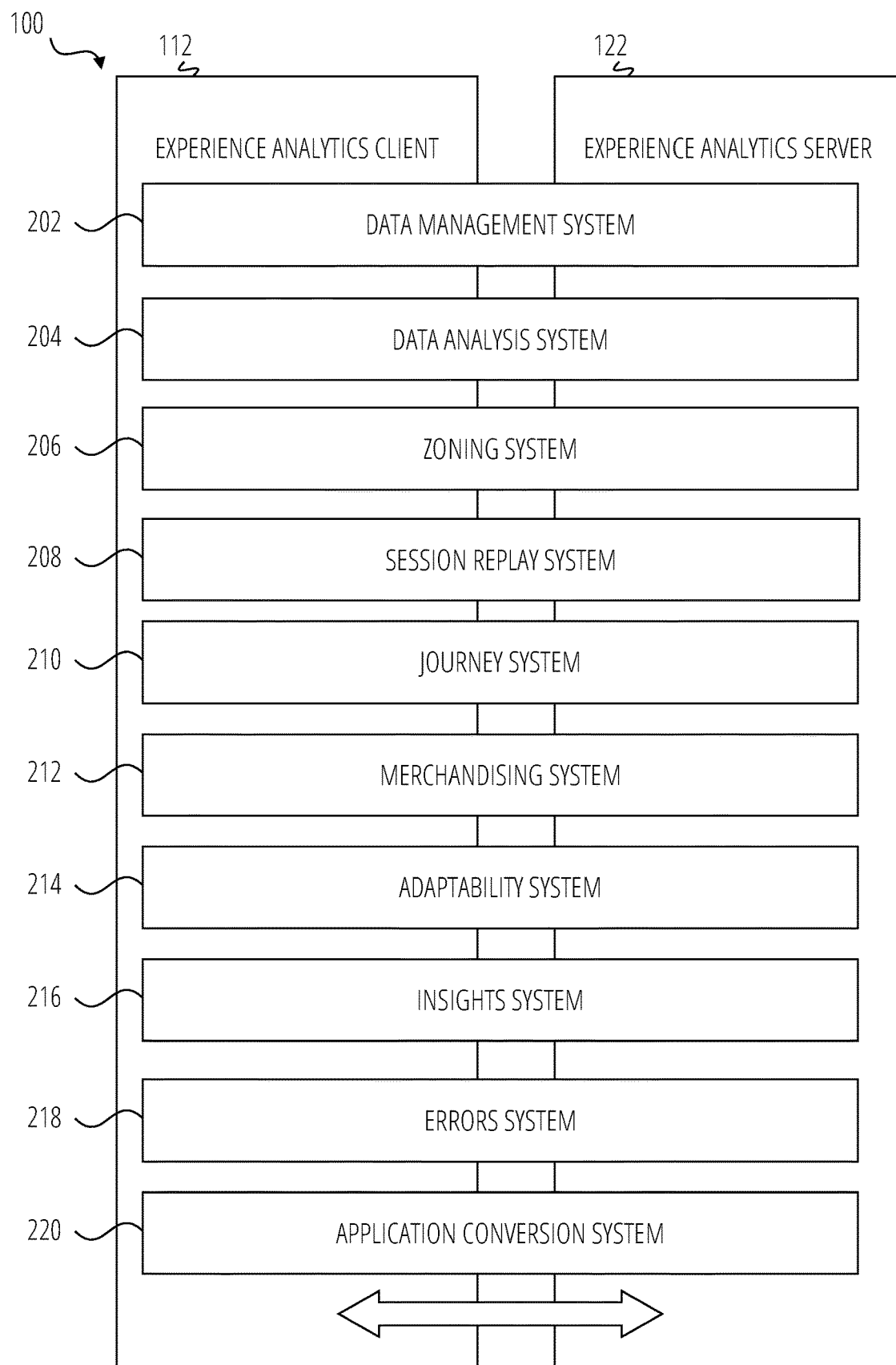
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 112 and the experience analytics server 122. The experience analytics system 100 embodies a number of subsystems, which are supported on the client-side by the experience analytics client 112 and on the server-side by the experience analytics server 122. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the processors 1204, the experience analytics script 114 executed by each of the customer client devices 104, and the third-party servers 108. The data management system 202 is also responsible for exporting data to the processors 1204 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the processors 1204 via the experience analytics client 112. The zoning interface provides a visualization of how the users via the customer client devices 104 interact with each element on the client's website. The zoning interface can also provide an aggregated view of in-page behaviors by the users via the customer client device 104 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the processors 1204. In one example, the data can be generated using information from the data analysis system 204.

The session replay system 208 is responsible for generating the session replay interface to be displayed by the processors 1204 via the experience analytics client 112. The session replay interface includes a session replay that is a video reconstructing an individual user's session (e.g., visitor session) on the client's website. The user's session starts when the user arrives into the client's website and ends upon the user's exit from the client's website. A user's session when visiting the client's web site on a customer client device 104 can be reconstructed from the data received from the user's experience analytics script 114 on customer client devices 104. The session replay interface can also include the session replays of a number of different visitor sessions to the client's website within a period of time (e.g., a week, a month, a quarter, etc.). The session replay interface allows the client via the processors 1204 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the processors 1204 via the experience analytics client 112. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 104) to the web site, and illustrates the visited pages and in order in which the pages were visited. The client viewing the journey interface on the processors 1204 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the processors 1204 via the experience analytics client 112. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's web site to be displayed by the customer client devices 104 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 114 to determine whether an accessibility-enhanced version of the client's website is needed, and can generate the accessibility-enhanced version of the client's website to be displayed by the customer client device 104.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the processors 1204 via the experience analytics client 112 on a dashboard of a user interface, as a pop-up element, as a separate panel, etc. In this example, the insights system 216 is responsible for generating an insights interface to be displayed by the processors 1204 via the experience analytics client 112. In another example, the insights can be incorporated in another interface such as the zoning interface, the session replay, the journey interface, or the merchandising interface to be displayed by the processors 1204.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 104 visiting the client's website). The errors can also include causes of looping behaviors by the users, in-page issues such as unresponsive calls to action and slow loading pages, etc. The errors can be displayed by the processors 1204 via the experience analytics client 112 on a dashboard of a user interface, as a pop-up element, as a separate panel, etc. In this example, the errors system 218 is responsible for generating an errors interface to be displayed by the processors 1204 via the experience analytics client 112. In another example, the insights can be incorporated in another interface such as the zoning interface, the session replay, the journey interface, or the merchandising interface to be displayed by the processors 1204.

The application conversion system 220 is responsible for the conversion of the functionalities of the experience analytics server 122 as provided to a client's website to a client's native mobile applications. For instance, the application conversion system 220 generates the mobile application version of the zoning interface, the session replay, the journey interface, the merchandising interface, the insights interface, and the errors interface to be displayed by the processors 1204 via the experience analytics client 112. The application conversion system 220 generates an accessibility-enhanced version of the client's mobile application to be displayed by the customer client devices 104.

Data Architecture

Figure 3:
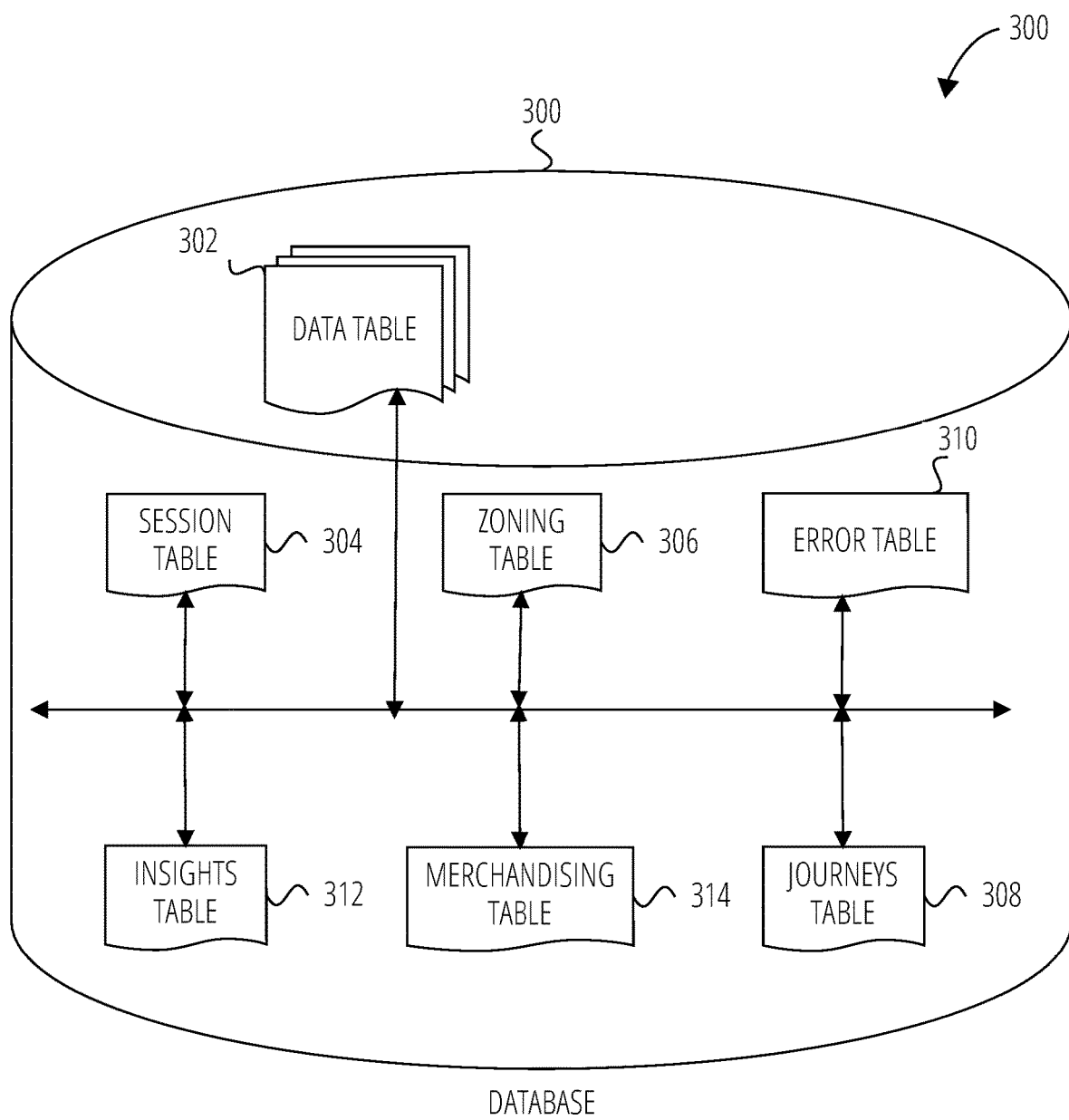
FIG. 3 is a diagrammatic representation of a data structure as maintained in a database, in accordance with some examples.

FIG. 3 is a schematic diagram illustrating database 300, which may be stored in the database 300 of the experience analytics server 122, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, a error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the web site being displayed on the customer client device 104, the elements on the web site being displayed or visible on the interface of the customer client device 104, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications. Session replays may include session events associated with browsing sessions. In one or more embodiments, session events correspond to user interactions with one or more elements, sections, zones (e.g., stored in association with the zoning table 306 discussed below), or the like, of a webpage. Examples of session events include, but are not limited to, user input of entering text in a text box, clicking a button with a mouse, tapping a button with a touchscreen, navigating to a webpage, navigating away from a webpage, scrolling up or down on the webpage, hovering over a webpage element, and the like, as well as any combination thereof. Session replay and recording may be executed by generating one or more logs, lists, and the like, of such events (e.g., as detected by an experience analytics script 114) included in a webpage accessed by a user of the customer client device 104. Such logs, lists, and the like may be stored in the session table 304, and may include one or more event descriptors including the event type, the event target, such as a specific button or text box, the event time, and the like, as well as combinations thereof.

The zoning table 306 stores data related to the zoning for each of the client's websites and native applications including the zones to be created and the zoning overlay associated with the websites and native applications. The journeys table 308 stores data related to the journey of each visitor to the client's website or through the native application. The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Figure 4:
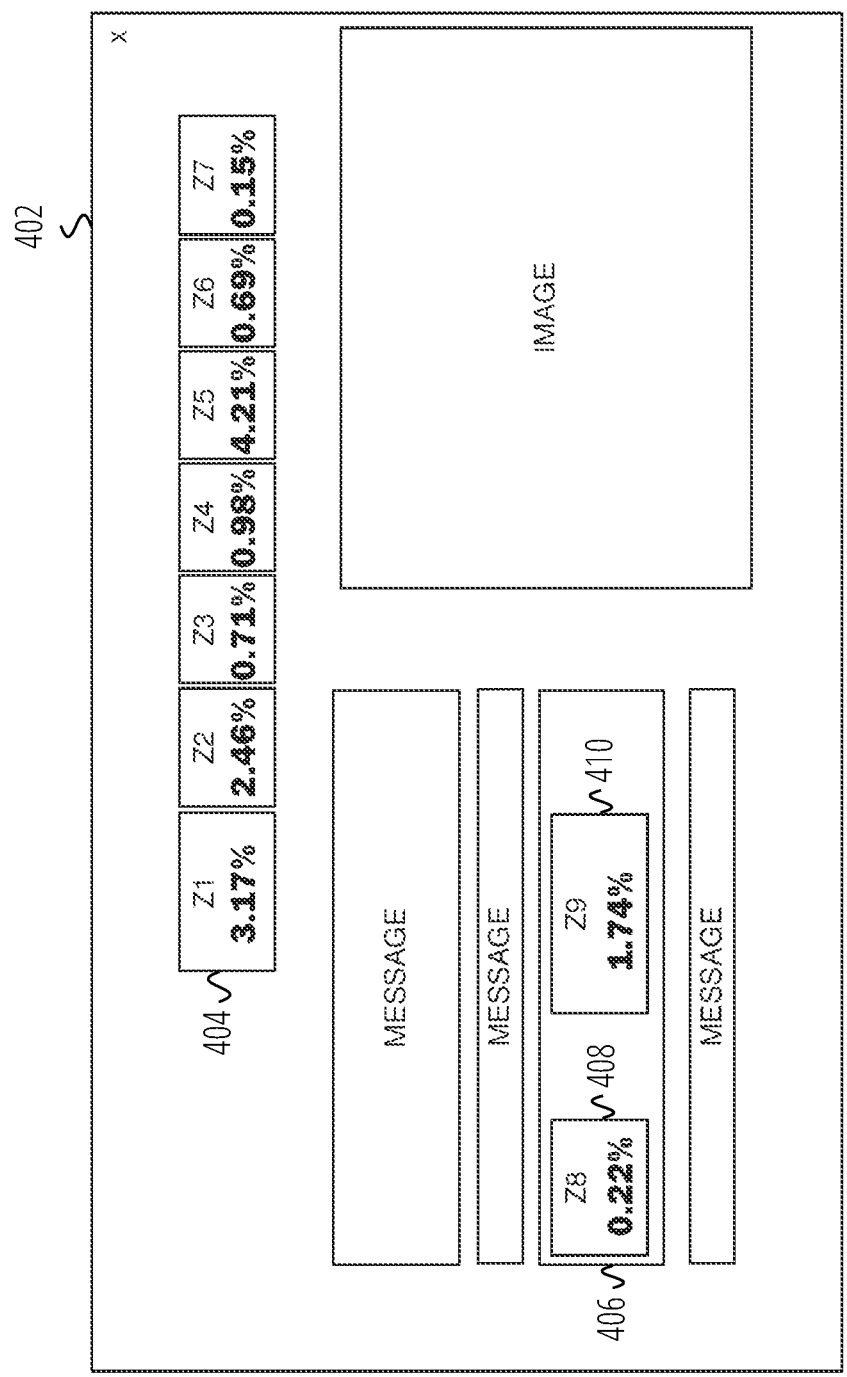
FIG. 4 is a user interface for presenting a webpage with performance information for zones in a webpage, according to some example embodiments.

FIG. 4 is a user interface 402 for presenting a webpage with performance information for zones in a webpage, in accordance with some examples. As discussed above, zones refer to the various content elements, fields, and other web components, that form the user-facing portions of a webpage or website. As an example, an online shopping web site may include a search bar, a "go to cart" button, and a "home page" button, where the search bar and the various buttons are each webpage zones.

Performance metrics refer to various quantifiable factors related to goal achievement. As an example, where a given goal targets a fifteen percent newsletter sign-up rate, a corresponding performance metric may be the percentage of site visitors clicking on a "subscribe to newsletter" button. An example metric of interest is an "average hover time," describing the average amount of time for which users hover the mouse cursor over given elements of the webpage.

With regard to zones (e.g., zone 404, 406, 408, 410), metrics may be overlaid on the zones for an easy way to compare zone metrics. The zone metrics include hover rate, click recurrence, attractiveness rate, exposure rate, and exposure time, but other metrics may also be included.

The hover rate is an average time spent hovering over the zone. The click recurrence is the average number of clicks on the zone for page views with at least one click on the zone. The attractiveness rate is the percentage of page views where the zone was visible on the screen with at least one click on the zone. The exposure rate is the percentage of page views where at least half of the zone was visible on the screen, and the exposure rate indicates how far the users are scrolling. Further, the exposure time is the average time with at least half of the zone is visible on the screen and indicates how long the zone is visible.

In the illustrated example in FIG. 4, the click recurrence for each zone is shown over imposed over the zone. For example, zone 404 shows that 3.17% of the users that view the zone click on the zone. Zones may also include other zones within, such as zone 406 that includes zone 408 (click recurrence of 0.22%) and zone 410 (click recurrence of 1.74%).

Regarding the exposure rate, in some example embodiments, the test of whether a user views the zone is that the user views at least a threshold portion of the zone. For example, viewing the zone may correspond with viewing the top half of the zone, corresponding to the vertical middle point of the zone is exposed to the user. The threshold may be configured by the user.

Figure 5:
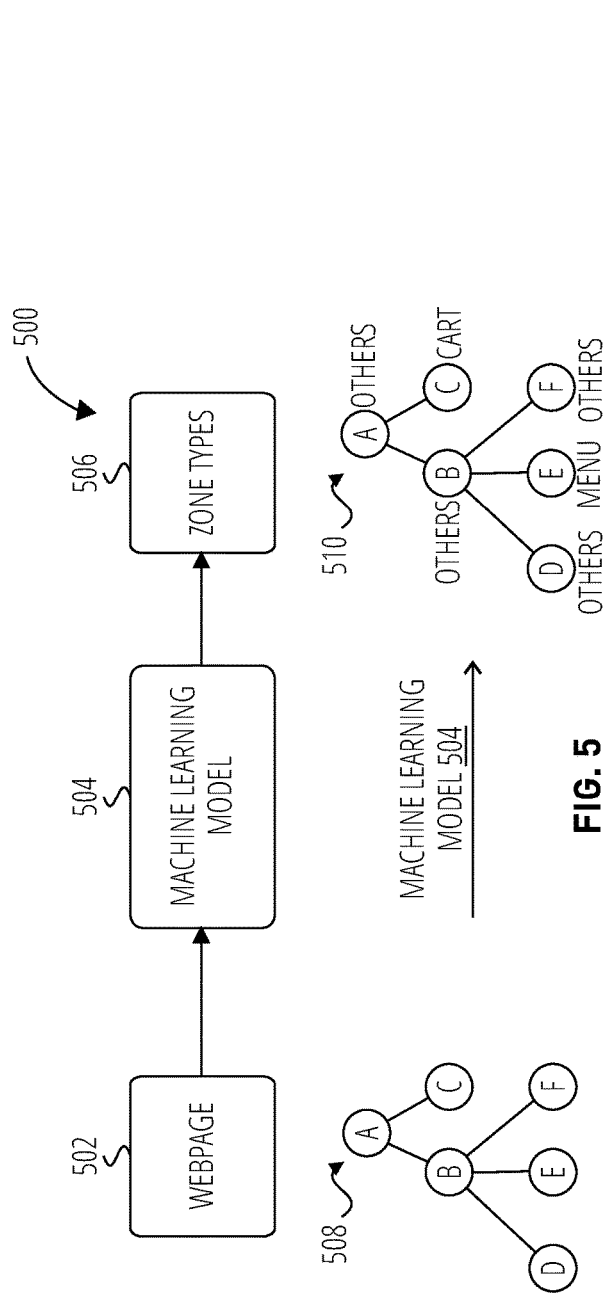
FIG. 5 illustrates a machine learning classification problem for determining zone types of a webpage, in accordance with some examples.

FIG. 5 illustrates a machine learning classification problem 500 for determining zone types of a webpage, in accordance with some examples. For explanatory purposes, the machine learning classification problem 500 is primarily described herein with reference to the member client device 102, the customer client device 104 and the experience analytics server 122 of FIG. 1. However, the machine learning classification problem 500 may correspond to one or more other components and/or other suitable devices.

As shown in FIG. 5, the machine learning classification problem 500 relates to a machine learning model 504. The machine learning model 504 may be implemented by the experience analytics server 122. In addition, the machine learning model 504 is based on the architectures discussed below with respect to FIGS. 6, 7, 9 and 10. The machine learning model 504 provides the experience analytics system 100 with the ability to learn without being explicitly programmed.

In one or more embodiments, the machine learning model 504 may implement or otherwise access machine learning algorithm(s) configured to learn from existing data and make predictions about new data. For example, the machine learning algorithm(s) operate by building the machine learning model 504 from example training data in order to make data-driven predictions or decisions expressed as zone types.

In the example of FIG. 5, the machine learning model 504 is configured to receive a webpage 502 as input, and to produce zone types 506 as output (e.g., for the automatic determination of zone types in a webpage). In this regard, the zone types 506 may be identified by analysis of the underlying HTML code of the webpage 502 and the corresponding document object model (DOM) tree 508 describing the webpage 502. In this regard, the DOM tree 508 provides a hierarchical description of the elements of the webpage 502 and the various sections and subsections of the webpage 502 to which those elements belong.

In one or more embodiments, the DOM tree 508 corresponds to an unlabeled DOM tree. The DOM tree 508 provides a visual representation of the hierarchical structure of the HTML code of the webpage 502, with elements represented as nodes (e.g., nodes A-F). Related nodes are joined by links, representing the relationships between two nodes. In the example DOM tree 508, links are established between nodes A and B, and between nodes A and C. In the example unlabeled DOM tree 508, nodes B and C are disposed on a second tier below the first tier occupied by node A, reflecting a structure in which the element represented by node A includes the elements represented by nodes B and C. Moreover, each of nodes D, E and F are linked to node B, and are disposed on a third tier below the second tier.

In one or more embodiments, the DOM tree 510 corresponds to a labeled DOM tree. The DOM tree 510 includes nodes A, B, D and F labeled as "others," node C labeled as "cart," and node E is labeled as "menu." Nodes may be labeled (or classified) according to methods as described herein.

Thus, the machine learning model 504 as described herein provides for labeling (classifying) the elements of the webpage 502, which corresponds to determining zone types for the nodes of the DOM tree 508. The experience analytics server 122 stores an indication of the zone types in the database 300 (e.g., in the zoning table 306). For example, based on the zone types stored in association with a given webpage, the experience analytics server 122 is able to more accurately provide zoning metrics and analysis for the webpage.

For example, a member user at the member client device 102 may request (e.g., via user input) to view metrics (e.g., zoning metrics) for a given webpage. In response, the member client device 102 provides a request to the experience analytics server 122 for the metrics. In response to the receiving the request, the experience analytics server 122 accesses session events (e.g., corresponding to aggregated user interactions across multiple instances of the customer client devices 104) stored in the database 300. Based on the session data, the experience analytics server 122 in conjunction with the zoning system 206 determines zoning metrics with respect to the determined zone types (e.g., zones) of the webpage 502. The zoning system 206 sends an indication of the zoning metrics to the member client device 102, and the member client device 102 displays the zoning metrics. For example, the zoning metrics are presented as overlays with respect to the webpage 502 displayed on the member client device 102.

Figure 6:
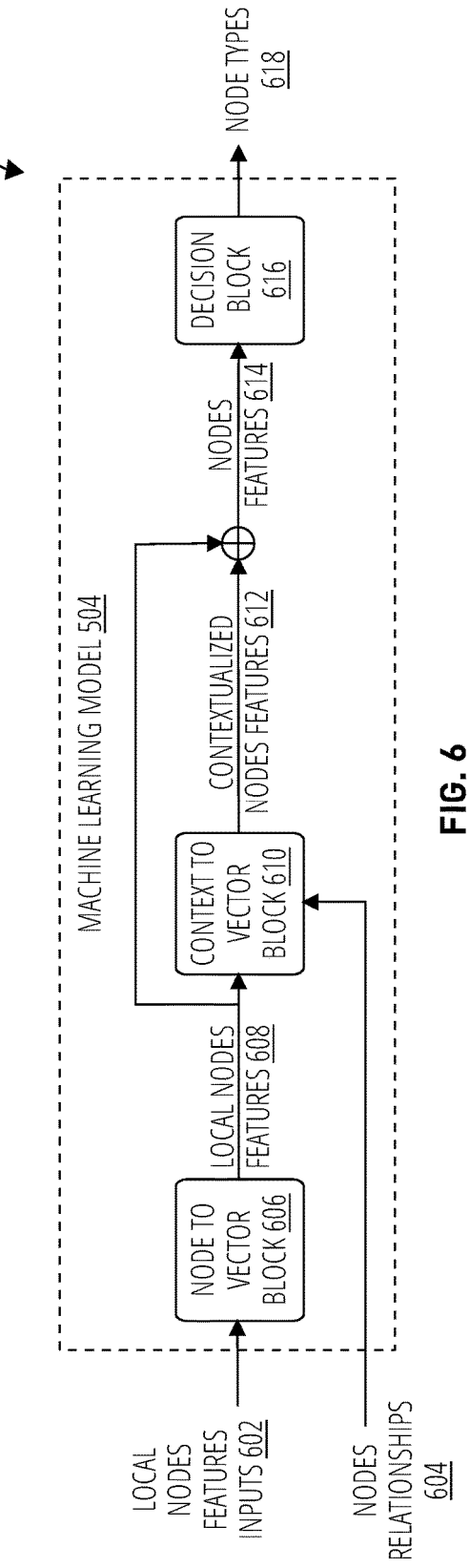
FIG. 6 illustrates an architecture for determining node types of webpage nodes, in accordance with some examples.

FIG. 6 illustrates an architecture 600 for determining node types of webpage nodes, in accordance with some examples. As noted above, the machine learning classification problem 500 of FIG. 5 includes the machine learning model 504. In the example of FIG. 6, the machine learning model 504 includes the node to vector block 606, the context to vector block 610 and the decision block 616.

As noted above with respect to FIG. 5, the machine learning model 504 receives a webpage 502 as input and outputs zone types 506. In the example of FIG. 6, the machine learning model 504 receives local nodes features inputs 602 and nodes relationships 604 (e.g., corresponding to the webpage 502 of FIG. 5) as input. In addition, the machine learning model 504 of FIG. 6 provides node types 618 (e.g., corresponding to the zone types 506 of FIG. 5) as output.

More specifically, the local nodes features inputs 602 are provided as input to the node to vector block 606 of the machine learning model 504. As noted above with respect to FIG. 5, the webpage 502 includes multiple nodes A-F representing elements of the webpage 502. The node to vector block 606 is configured to receive the local nodes features inputs 602, and to generate the local nodes features 608 as output. As discussed further below with respect to FIG. 7, the local nodes features inputs 602 correspond to multiple nodes inputs 706-714. The multiple nodes inputs correspond to raw data types of an HTML code snippet, and include displayed text input 706 (e.g., text displayed at rendering), HTML code input 708 (e.g., HTML code snippet minus the displayed rendered text), ID attribute input 710, classname attribute input 712, and other attributes input 714.

As shown in the example of FIG. 6, the local nodes features 608 are provided as input to the context to vector block 610. In addition, the context to vector block 610 is configured to receive the nodes relationships 604 as input. As discussed further below with respect to FIGS. 8-9, the nodes relationships 604 are generated based on traversing a page tree based on tree recursion, and are formatted as a matrix (e.g., the matrix 806). The matrix 806 is provided as input to the context to vector block 610, corresponding to FIG. 9. Moreover, the context to vector block 610 is configured to output contextualized nodes features 612.

As shown in the example of FIG. 6, the local nodes features 608 and the contextualized nodes features 612 are summed to produce the nodes features 614. The nodes features 614 are provided as input to the decision block 616, which is configured to output node types 618. As discussed further with respect to FIG. 10, the node types 618 may correspond to different page categories, such as account creation, cart, home, category and product.

Figure 7:
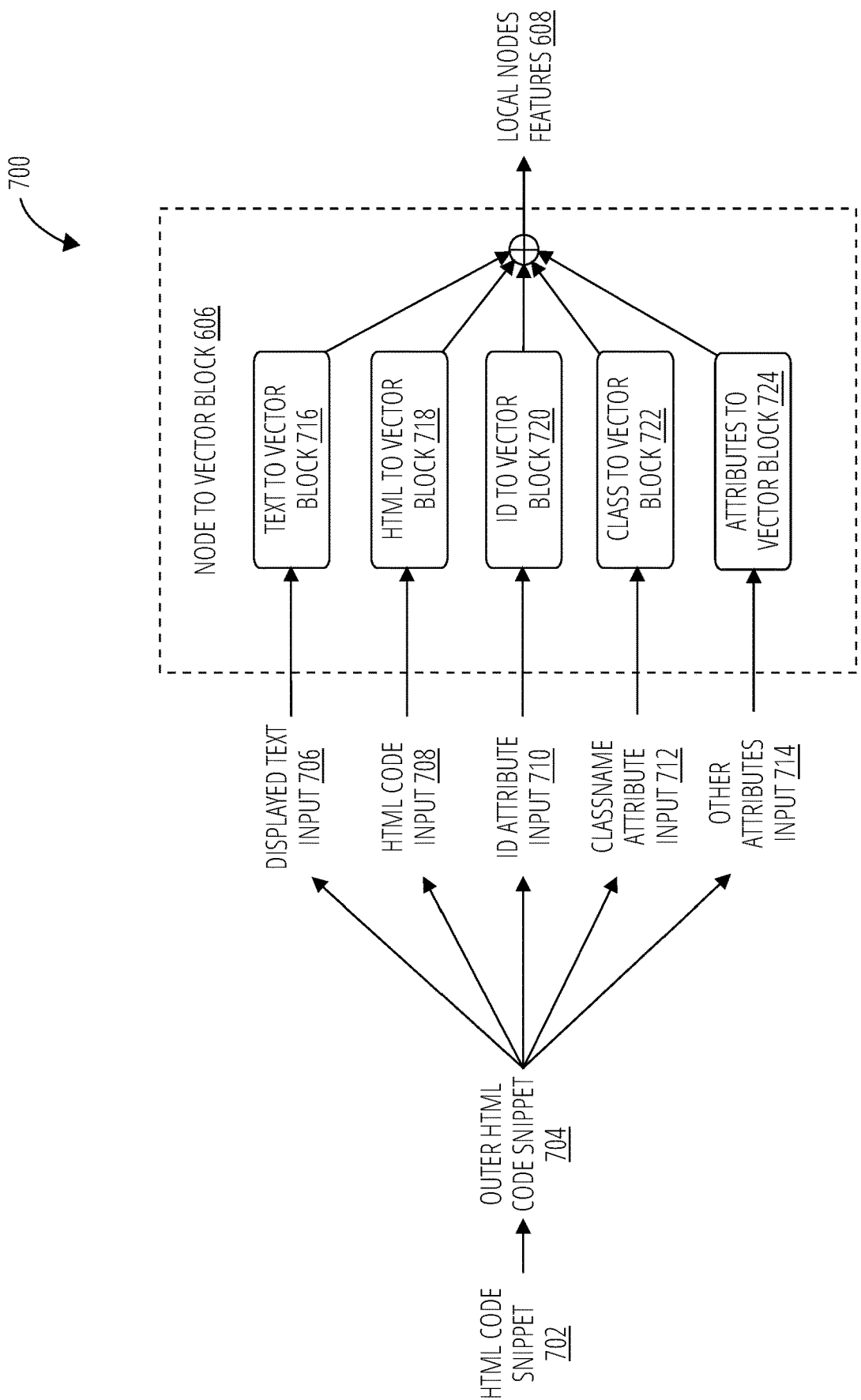
FIG. 7 illustrates an architecture for generating vectors representing node features, in accordance with some examples.

FIG. 7 illustrates an architecture 700 for generating vectors representing node features, in accordance with some examples. As noted above, the architecture 600 of FIG. 6 includes the node to vector block 606. In the example of FIG. 7, the node to vector block 606 includes the text to vector block 716, the HTML to vector block 718, the ID to vector block 720, the class to vector block 722 and the attributes to vector block 724.

As noted above with respect to FIG. 6, the node to vector block 606 receives the local nodes features inputs 602 as input. In the example of FIG. 7, the node to vector block 606 receives attributes 706-714 (e.g., corresponding to local nodes features inputs 602 of FIG. 6) as input. In addition, the node to vector block 606 of FIGS. 6 and 7 provides the local nodes features 608 as output. As described herein, the node to vector block 606 provides for transforming every input of a node to a vector, and concatenating everything into one vector (e.g., the local nodes features 608).

In this regard, the local nodes features inputs 602 of FIG. 6 may correspond to a raw HTML code snippet 702, which is reduced to an outer HTML code snippet 704. The outer HTML code snippet 704 from the webpage 502 may be used to produce the attributes of the displayed text input 706, the HTML code input 708, the ID attribute input 710, the classname attribute input 712 and the other attributes input 714.

By way of non-limiting example, the following HTML code snippet 702 may be considered with respect to FIG. 7:

| HTML code snippet |
| --- |
| <div name="Michael" id="menu_bar"><br>  hello dear reader.<br>  <span class="fancy" type="fire"><br>    <div id="menu_section" class="not_so_fancy_after_all clear" type="dragon" data="exposed"><br>      how are you doing?<br>    </div><br>    I hope you are enjoying what you read.<br>  </span><br>  <a href="https://www.youtube.com/watch?v=buHrSbwHXbo" name="Amine"> |

| HTML code snippet |
|---|
| How about a little break?<br></a><br></div> |

In one or more embodiments, the architecture 700 corresponds to a page-level model that uses a tree structure. As such, the architecture 700 does not provide for the node to vector block 606 to process the entire HTML code snippet 702 (e.g., including its children HTML code) for every node. Rather, the HTML code snippet 702 considered for information extraction is reduced to the outer HTML code snippet 704, by deleting the child-based portion of the HTML code snippet. Based on the above example HTML code snippet, the architecture 700 is configured to use the following as the outer HTML code snippet 704:
<div name="Michael" id="menu_bar">
hello dear reader.
</div>

Outer HTML Code Snippet

Regarding the displayed text input 706 from the outer HTML code snippet 704, the architecture 700 provides for extracting the displayed text of "hello dear reader."

In one or more embodiments, the displayed text is considered a sequence of words. A known algorithm (e.g., the BERT AI model) may be used to embed each of the words in the above sequence into vectors. For example, the displayed text may be modeled as a sequence of word vectors on which one-dimensional convolutional layers and one-dimensional pooling layers are applied (e.g., Bert Word embedding is used). Thus, the displayed text input 706 is modeled as the text to vector block 716.

Regarding the HTML code input 708, in one or more embodiments, the displayed text is deleted from the outer HTML code snippet 704. In the above example, "hello dear reader" is deleted, resulting only in the following as the HTML code input 708:
"<div name="Michael" id="menu_bar">
</div>"

Then, the outer HTML code snippet 704 (as modified by deleting the displayed text), is considered as a sequence of characters. In this regard, character embedding may be learned in the training, as discussed below with respect to sequence modelization. One example of an input format is depicted in the following Table 1:

TABLE 1

| < | d | i | v | n | a | m | etc |
|---|---|---|---|---|---|---|---|
| 0 | 35 | 66 | 4 | 78 | 75 | 43 | etc |

In Table 1, the first row denotes a character of the outer HTML code snippet 704 (as modified), and the second row indicates a numeric index in the vocabulary of characters. In one or more embodiments, the HTML code is modeled as a sequence of characters on which one-dimensional convolutional layers and one-dimensional pooling layers are applied (e.g., embedding learned with task). Thus, the HTML code input 708 is modeled as the HTML to vector block 718.

Regarding the ID attribute input 710 from the outer HTML code snippet 704, the architecture 700 provides for extracting the ID from the outer HTML code snippet 704. In one or more embodiments, the HTML ID attribute is modeled as a sequence of characters on which one-dimensional convolutional layers and one-dimensional pooling layers are applied (e.g., embedding learned within training). Thus, the ID attribute input 710 is modeled as the ID to vector block 720.

Regarding the classname attribute input 712, the architecture 700 is configured to perform the same process of extracting the ID but with the classname of the outer HTML code snippet 704. In one or more embodiments, the HTML class attribute is modeled as a sequence of characters on which one-dimensional convolutional layers and one-dimensional pooling layers are applied (e.g., embedding learned with task). Thus, the ID attribute input 710 is modeled as the class to vector block 722.

Regarding the other attributes input 714, it is noted that other attributes may be relevant for classification, including title, alt, role, type, itemprop, name, label, placeholder and/or aria-label. However, such attributes are generally scarce (relative to the above-discussed attributes) of appearance in tags. Modeling each of the other attributes alone would likely result in sparse inputs. As such, in one or more embodiments, the architecture 700 models the other attributes in a joint input.

From the outer HTML code snippet 704, the architecture 700 provides for extracting all the other attributes by order of appearance. In one or more embodiments, the list of other HTML attributes is modeled as a sequence of characters on which one-dimensional convolutional layers and Done-dimensional pooling layers are applied (e.g., embedding learned with task). Thus, the other attributes input 714 are modeled as the attributes to vector block 724.

As shown in the example of FIG. 7, the vectors output from each of the vector blocks 716-724 is summed to produce the local nodes features 608. Thus, the output of the node to vector block 606 corresponds to the local nodes features 608.

Figure 8:
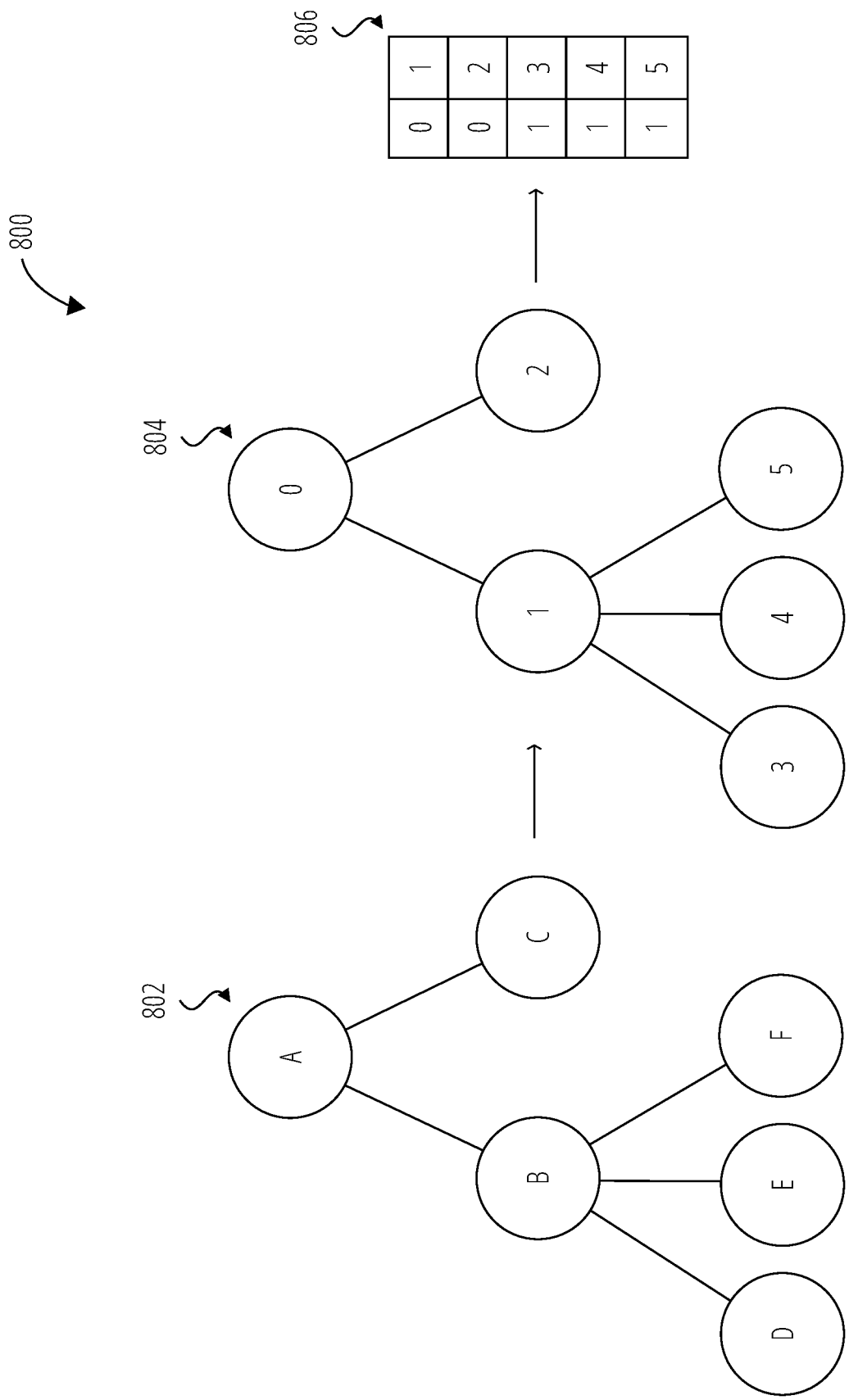
FIG. 8 illustrates a tree structure representation for representing parent-child relations for a webpage, in accordance with some examples.

FIG. 8 illustrates a tree structure architecture 800 for representing parent-child relations for a webpage, in accordance with some examples. As noted above with respect to FIG. 6, the nodes relationships 604 are generated based on traversing a page tree based on tree recursion, and are formatted as a matrix for input to the context to vector block 610. To model the tree structure, the tree structure architecture 800 employs a matrix of adjacency, for example, a 2D matrix representing parent-child relations.

In the example of FIG. 8, the tree 802 corresponds to the DOM tree 508 of FIG. 5. Nodes A-F are converted to nodes 1-5 in tree 804. Nodes 1-5 of tree 804 are then represented in matrix form as depicted in the matrix 806, which correspond to the nodes relationships 604.

In one or more embodiments, a batch of p trees with Ni nodes and Ei edges is considered. Every node in a tree has one and only one parent, except for the root node. As such, Equation 1 may denote:

$$E_i = N_i - 1 \qquad \text{Equation 1}$$

From this, it is possible to denote Equations 2 and 3 as:

$$N = \sum_{i=1}^{p} N_i \quad \text{Equation 2}$$

$$E = \sum_{i=1}^{p} E_i \quad \text{Equation 3}$$

In one or more implementations, model inputs may include:
- text_features, html_features, ID_features, classname_features, attributes_features—result of the vectorization of the N nodes with node2vec block (all nodes from all pages in batch).
- adjacency_list—A size E×2 array containing the node indexes of the parent node and child node for every connection in every tree i in batch. For every Ni, nodes indexes are shifted according to Equation 4:

$$\sum_{k=1}^{i} N_k \quad \text{Equation 4}$$

- node_order-A size N array containing the calculation step at which a node can be evaluated. In one or more implementations, the order that node data is stored in *_features (corresponding to text_features, html_features, D_features, classname_features, attributes_features) and node_order should be identical.
- edge_order—A size E array containing the calculation step at which each entry in the adjacency_list is needed in order to retrieve the child nodes for a current node. In one or more implementations, the order that parent-child data is stored in adjacency_list and edge_order must be identical.
- tree sizes—A size p array containing Ni for i from 1 to p In one or more implementations, node_order and edge_order hold redundant information derivable from the adjacency_list and *_features (corresponding to text_features, html_features, D_features, classname_features, attributes_features). However, precomputing these tensors gives a significant performance improvement in speed. As discussed below with respect to FIG. 9, recursion is applied in the tree over all nodes to build the context vector for each node.

Figure 9:
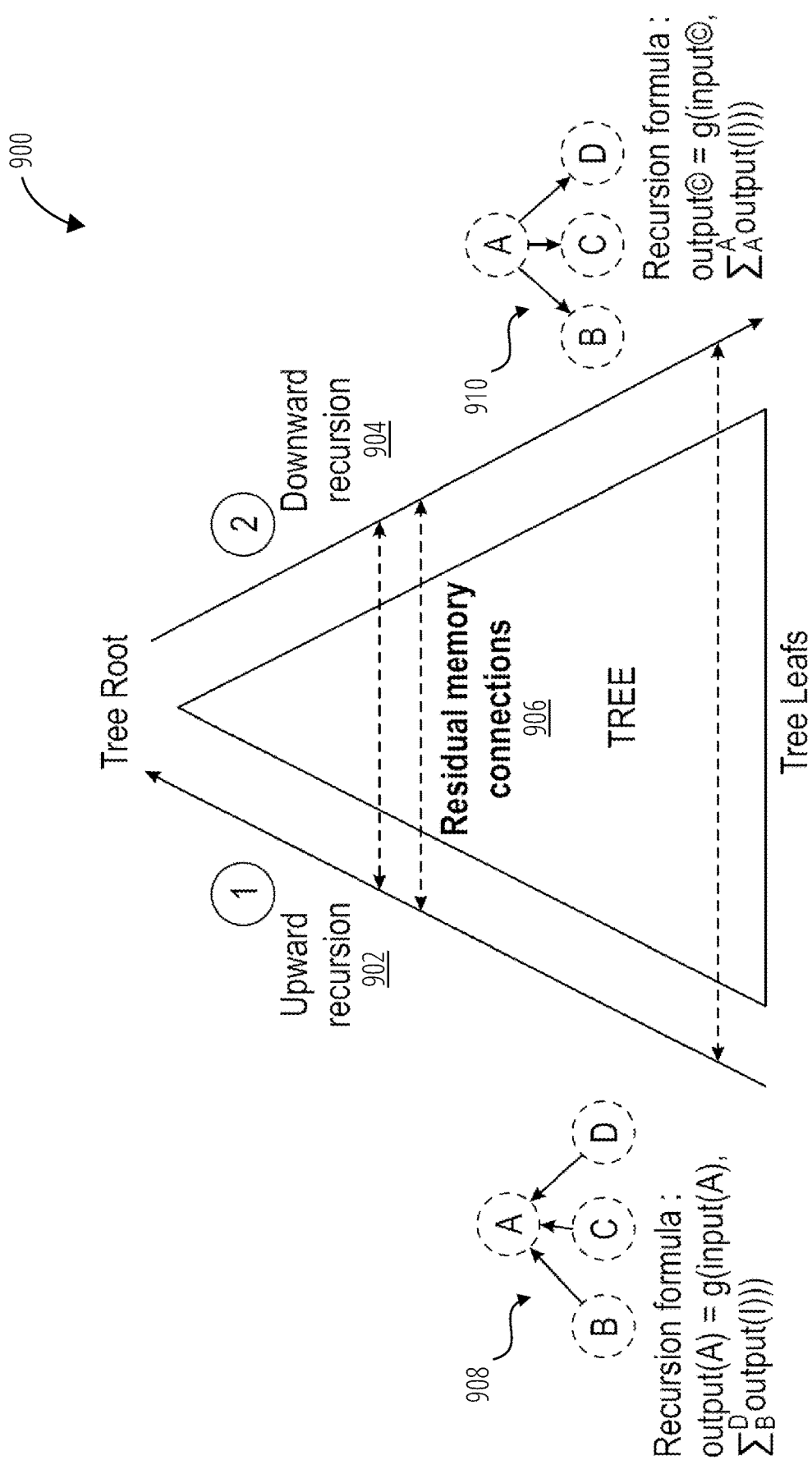
FIG. 9 illustrates a tree diagram for applying recursion over all tree nodes to build the context vector for each node, in accordance with some examples.

FIG. 9 illustrates a tree diagram 900 for applying recursion over all tree nodes to build the context vector for each node, in accordance with some examples. For example, long short term memory (LTSMs) is a modelization used to model a 1 dimensional sequence in a deep learning model. TreeLSTM corresponds to an N-dimensional generalization (e.g., N variable).

As shown in the example of FIG. 9, context node features (e.g., or hidden states in LSTMs) are built through the following operations: an upward recursion operation 902 corresponding to an upward Tree-LSTM pass to build nodes hidden states in a bottom up fashion from local nodes features; a downward recursion operation 904 corresponding to a downward Tree-LSTM pass to build nodes hidden states in a top down fashion from upward hidden states; a residual connections operation 906 in which residual connections are applied between upward and downward hidden states; and sum upward operation 908 (e.g., the recursion formula for the upward recursion operation 902) and sum downward operation 910 (e.g., the recursion formula for the downward recursion operation 904) corresponding to sum upward and downward hidden states vectors.

Based on the recursion applied with respect to the tree diagram 900, the nodes relationships 604 (FIG. 6) and the local nodes features 608 of (FIGS. 6 and 7) are provided as input to the context to vector block 610. Based on these inputs, the context to vector block 610 is configured to output the contextualized nodes features 612.

Figure 10:
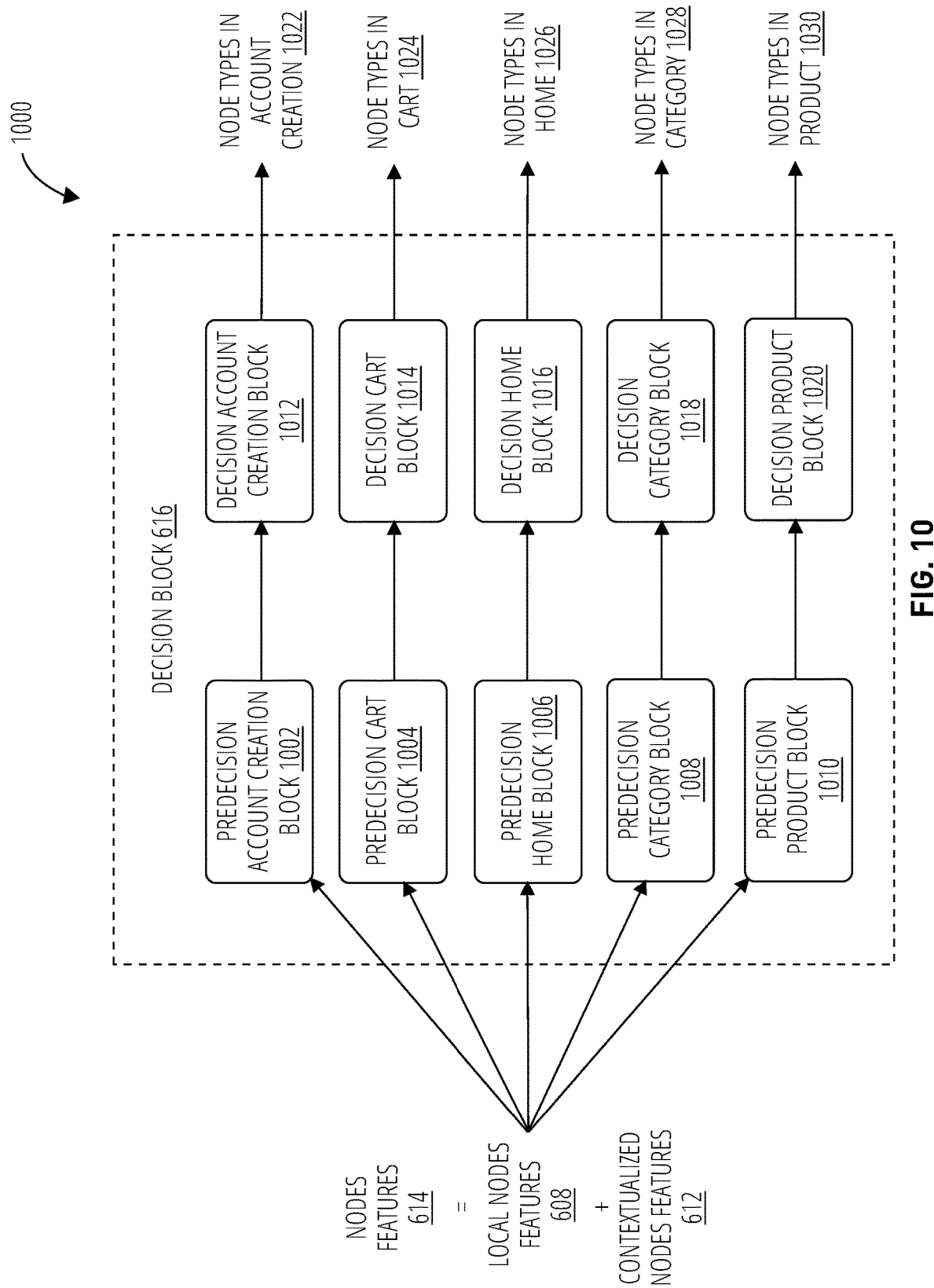
FIG. 10 illustrates a decision architecture for outputting node types corresponding to page categories, in accordance with some examples.

FIG. 10 illustrates an architecture 1000 for outputting node types corresponding to page categories, in accordance with some examples. As noted above, the architecture 600 of FIG. 6 includes the decision block 616. In the example of FIG. 10, the decision block 616 includes predecision creation blocks 1002-1010, and decision creation blocks 1012-1020.

As noted above with respect to FIG. 6, the decision block 616 receives the nodes features 614 as input, with the nodes features 614 being a sum of the local nodes features 608 and the contextualized nodes features 612. Thus, in the example of FIG. 10, the decision block 616 is depicted as receiving the nodes features 614 as input, where the nodes features 614 is equal to the local nodes features 608 plus the contextualized nodes features 612. As noted above with respect to FIG. 6, the decision block 616 provides the node types 618 as output.

In one or more embodiments, the architecture 1000 corresponds to a decision dense vector and application of a normalized exponential function (e.g., softmax). However, as zone types have dependencies to page categories (e.g., some zone node types in cart 1024 are present only in some page categories), the architecture 1000 is configured to perform N classifications (e.g., where N=number of page categories), corresponding to an N branch output model.

As seen in the example of FIG. 10, the output of the decision blocks 1012-1020 are node types 1022-1030 which correspond to the page categories. In one or more embodiments, the page categories include the categories of account creation, cart, home, category and product. Node types (or classes) may be associated with respective page categories. It is noted that the list of page categories in FIG. 10 is given as an example. The machine learning model 504 may be configured to learn using the same method with a different/extended list of page categories.

Thus, in the example of FIG. 10, the architecture 1000 depicts N classifications being performed with respect to the nodes features 614 (e.g., where the nodes features 614=the local nodes features 608+the contextualized nodes features 612), as follows: account creation including predecision account creation block 1002, decision account creation block 1012 and node types in account creation 1022; cart including predecision cart block 1004, decision cart block 1014 and node types in cart 1024; home including predecision home block 1006, decision home block 1016 and node types in home 1026; category including predecision category block 1008, decision category block 1018 and node types in category 1028; and product including predecision product block 1010, decision product block 1020 and node types in product 1030. It is noted that each page category has a predecision and a decision block, and the page categories N can vary from one model to another.

In one or more embodiments, residual connections may be introduced. In a first example, residual memory connections are introduced inside Bidirectional TREE-LSTM (e.g., as discussed above with respect to FIG. 9). Skip connections may be used for memory vectors in order to improve forward and backward flow in the tree walk (recursive calculations). For example, see Equation 5 below:

$$\text{memory}_{downward}(A) = \text{memory}_{upward}(A) + g\left(\text{input}(A), \sum_{parent(A)} \text{memory}_i\right) \quad \text{Equation 5}$$

Alternatively or in addition, skip connections are introduced between local nodes features and contextual nodes features as they have different purpose. For example, local nodes features are features that rely only on the node information. Some classes like cart, account, call to attention (cta) submit cart may only need local information. Moreover, contextual nodes features are those that encode node neighborhood information. Intuitively, classes like menu, filters, all products may rather rely these features.

Thus, the modelization as described herein provides for building a model with good performance, without requiring features engineering. For example, data is fed to the model(s) in a raw form. For pages, the exact tree structure is provided to the model. For nodes within pages, the HTML code snippet is used and try to embed and encode it within the training.

As such, the model training as described herein may be page category agnostic and zone type agnostic. In other words, given a different dataset, different zone types and different page categories, no additional effort may be needed for training a new model on it (e.g., no features engineering, analysis, selection etc). This may be especially practical when the list of page categories and zone types evolve over time. Table 3 below illustrates example page categories and zone types.

Figure 11:
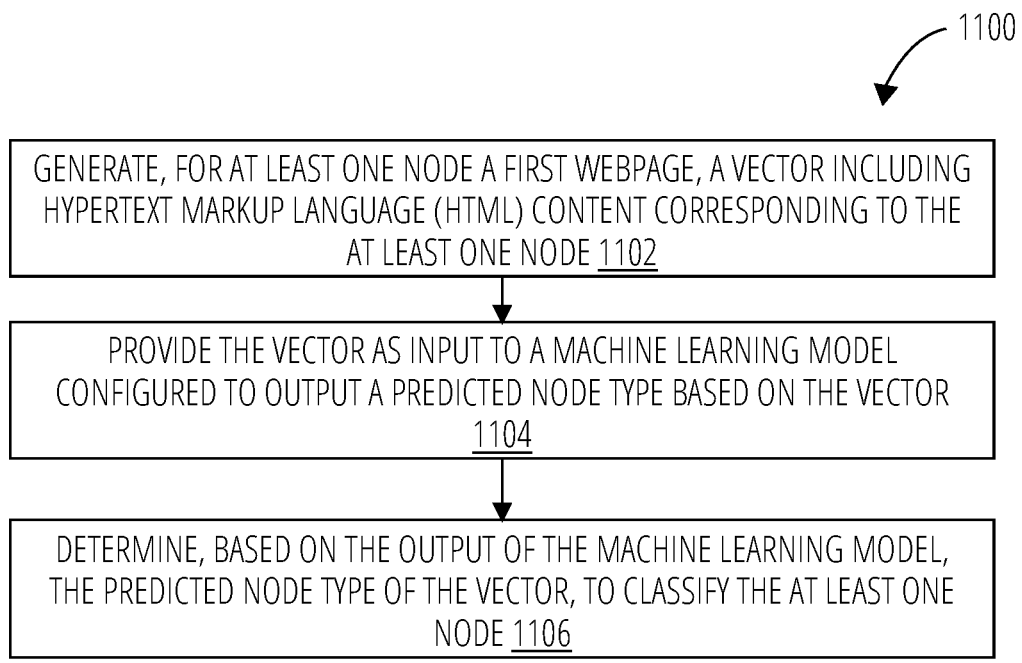
FIG. 11 is a flowchart illustrating a process for determining zone types of a webpage, in accordance with some examples.

FIG. 11 is a flowchart illustrating a process 1100 for determining zone types of a webpage, in accordance with some examples. For explanatory purposes, the process 1100 is primarily described herein with reference to the experience analytics server 122 of FIG. 1. However, one or more blocks (or operations) of the process 1100 may be performed by one or more other components, and/or by other suitable devices. Further for explanatory purposes, the blocks (or operations) of the process 1100 are described herein as occurring in serial, or linearly. However, multiple blocks (or operations) of the process 1100 may occur in parallel or concurrently. In addition, the blocks (or operations) of the process 1100 need not be performed in the order shown and/or one or more blocks (or operations) of the process 1100 need not be performed and/or can be replaced by other operations. The process 1100 may be terminated when its operations are completed. In addition, the process 1100 may correspond to a method, a procedure, an algorithm, etc.

The experience analytics server 122 generates, for at least one node a first webpage, a vector including HTML content corresponding to the at least one node (block 1102). The at least one node may correspond to a DOM corresponding to the first webpage. The HTML content of the vector may include HTML code, displayed text, an ID attribute, classname attributes and a list of other attributes corresponding to the at least one node.

The experience analytics server 122 provides the vector as input to a machine learning model (block 1104). The machine learning model is configured to output a predicted node type based on the vector, the machine learning model having been trained with plural vectors including HTML content corresponding to plural nodes of second webpages.

TABLE 3

| account creation | cart | category | home | product | checkout/lead generation |
|---|---|---|---|---|---|
| account | account | account | account | account | account |
| cart | breadcrumb | all_products | cart | breadcrumb | cart |
| first_name | cart | breadcrumb | menu | cart | cta_already_have_account |
| surname | continue_shopping | cart | push_product | cross_sell | cta_connection |
| miss_mr | search_bar | cta_add_to_cart | push_social_media | search_bar | cta_create_an_account |
| search_bar | delete | cta_see_product | seach_bar | features_selection | cta_proceed |
| menu | menu | filters | banner | in_store_availability | email_address |
| client_email | product_picture | menu | slideshow | menu | facebook_login |
| client_password | push_product | pagination_cta_see_more | special_offer | product_tiny_pictures | forgot_password |
| creation_email | promotional_code | product_picture | push_branding | product_details | general_conditions |
| creation_password | quantity | search_bar | push_category | quantity | guest_checkout |
| creation_password_confirmation | cta_submit_basket | sort | | cta_add_to_cart | menu |
| cta_proceed | reinsurance | banner | | shipping_information | password |
| general_conditions | product_title | slideshow product_quick_view | | back_to_list in_store_reservation find_a_store historic wishlist product_big_picture link_to_reviews | search_bar |

The machine learning model may be configured to estimate a respective node type for each category within a set of webpage categories. The predicted node type may be based on the estimated respective node types. The set of webpage categories may include home, product, cart, category and account creation categories.

The experience analytics server 122 determines, based on the output of the machine learning model, the predicted node type of the vector, to classify the at least one node (block 1106). The experience analytics server 122 may store (e.g., in the database 300) an indication of the predicted node type in association with the at least one node.

The experience analytics server 122 may determine a second vector including context data for the at least one node. Determining the predicted node type of the vector is further based on the second vector. The context data may be based on a performing on a tree-based recursion algorithm with respect to parent-child node relationships of the first webpage.

The experience analytics server 122 may cause, based on classifying the at least one node, display of zoning metrics in association with the at least one node. The zoning metrics may be displayed (e.g., on the member client device 102) as an overlay corresponding to the at least one node, in association with display of the webpage.

The at least one node may include plural nodes of the first webpage. The generating, providing, determining and causing are performed with respect to each one of the plural nodes, to determine zone types for the webpage.

Machine Architecture

Figure 12:
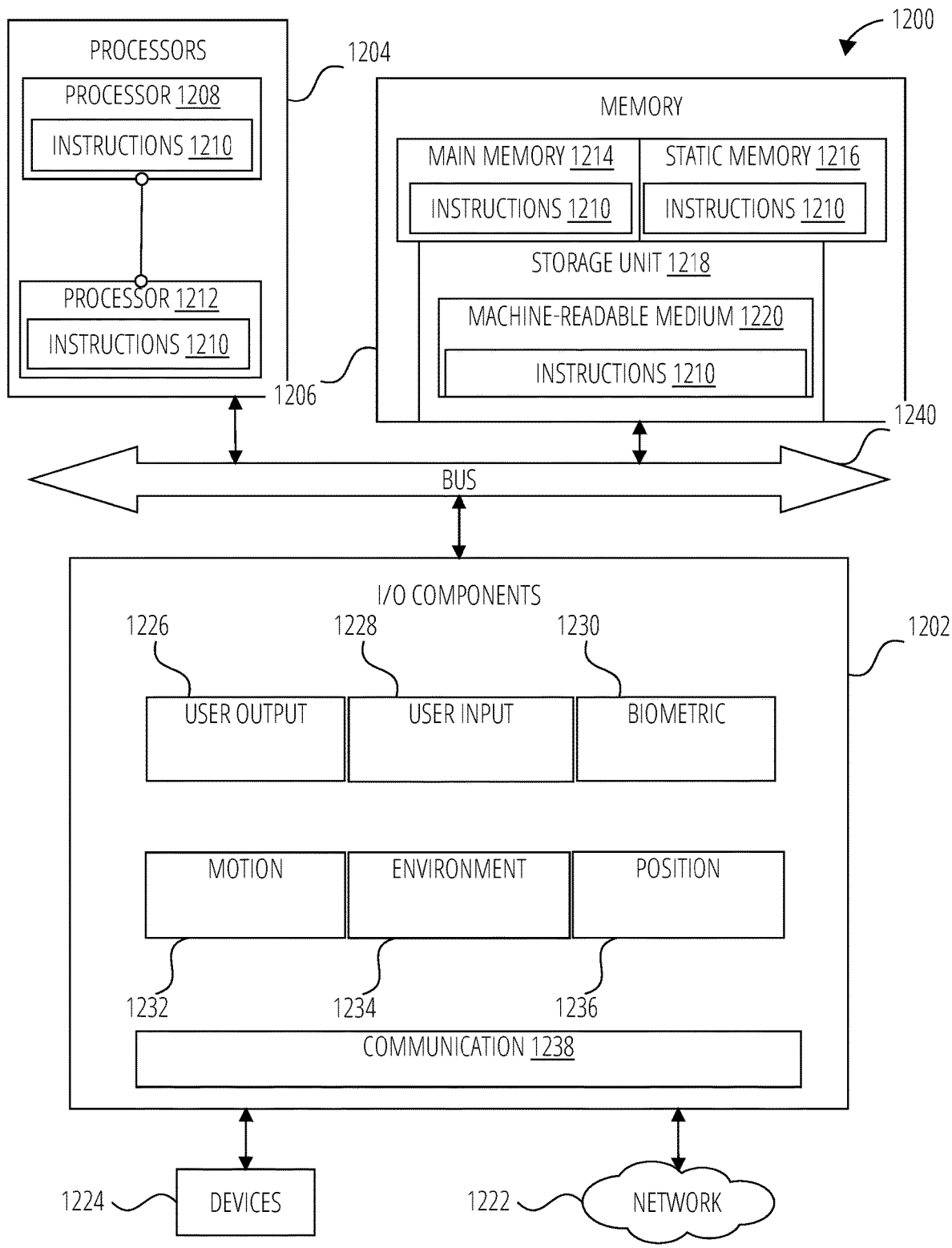
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1210 (e.g., software, a program, an application, an applet, an application, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein. The machine 1200, for example, may comprise the processors 1204 or any one of a number of server devices forming part of the experience analytics server 122. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1202, which may be configured to communicate with each other via a bus 1240. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that execute the instructions 1210. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1214, a static memory 1216, and a storage unit 1218, both accessible to the processors 1204 via the bus 1240. The main memory 1206, the static memory 1216, and storage unit 1218 store the instructions 1210 embodying any one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the processor's cache memory), or any suitable combination thereof, during execution thereof by the machine 1200.

The I/O components 1202 may include a wide variety of components to receive input, provide output, produce output, transmit information, exchange information, capture measurements, and so on. The specific I/O components 1202 that are included in a particular machine will depend on the type of machine. For example, portable machines such as mobile phones may include a touch input device or other such input mechanisms, while a headless server machine will likely not include such a touch input device. It will be appreciated that the I/O components 1202 may include many other components that are not shown in FIG. 12. In various examples, the I/O components 1202 may include user output components 1226 and user input components 1228. The user output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope).

The environmental components 1234 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the processors 1204 may have a camera system comprising, for example, front cameras on a front surface of the processors 1204 and rear cameras on a rear surface of the processors 1204. The front cameras may, for example, be used to capture still images and video of a user of the processors 1204 (e.g., "selfies"). The rear cameras may, for example, be used to capture still images and videos in a more traditional camera mode. In addition to front and rear cameras, the processors 1204 may also include a 360° camera for capturing 360° photographs and videos.

Further, the camera system of a processors 1204 may include dual rear cameras (e.g., a primary camera as well as a depth-sensing camera), or even triple, quad or penta rear camera configurations on the front and rear sides of the processors 1204. These multiple cameras systems may include a wide camera, an ultra-wide camera, a telephoto camera, a macro camera and a depth sensor, for example.

The position components 1236 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface component or another suitable device to interface with the network 1222. In further examples, the communication components 1238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and memory of the processors 1204) and storage unit 1218 may store one or more sets of instructions and data structures (e.g., software) embodying or used by any one or more of the methodologies or functions described herein. These instructions (e.g., the instructions 1210), when executed by processors 1204, cause various operations to implement the disclosed examples.

The instructions 1210 may be transmitted or received over the network 1222, using a transmission medium, via a network interface device (e.g., a network interface component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Software Architecture

Figure 13:
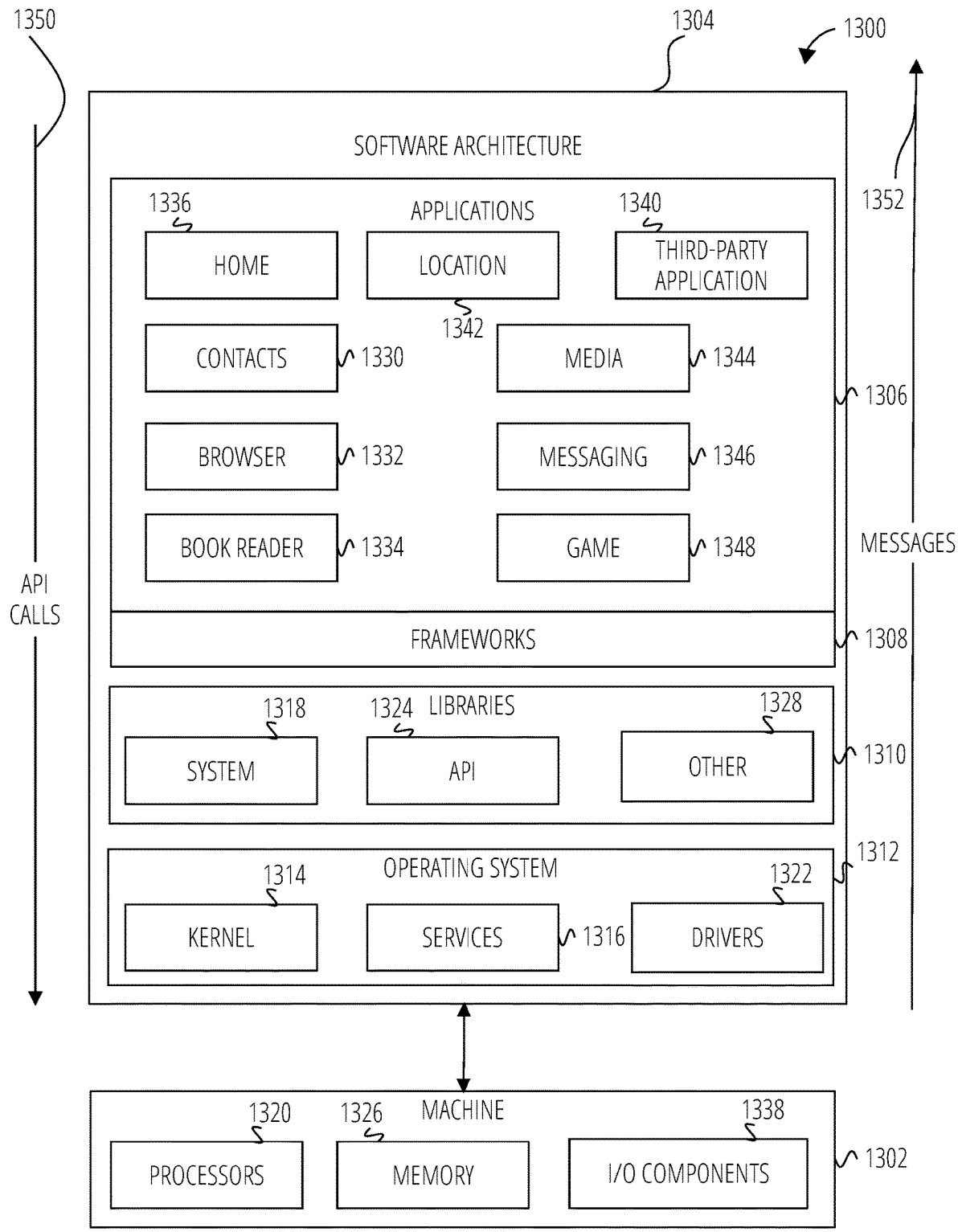
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:
1. A method, comprising:
   generating, for at least one node a first webpage, a vector including HyperText Markup Language (HTML) content corresponding to the at least one node;
   providing the vector as input to a machine learning model, wherein the machine learning model is configured to output a predicted node type based on the vector, the machine learning model having been trained with plural vectors including HTML content corresponding to plural nodes of second webpages;

determining, based on the output of the machine learning model, the predicted node type of the vector, to classify the at least one node; and causing, based on classifying the at least one node, display of zoning metrics in association with the at least one node, wherein the zoning metrics are displayed as an overlay corresponding to the at least one node, in association with display of the webpage.

2. The method of claim 1, wherein the at least one node corresponds to a document object model (DOM) corresponding to the first webpage.

3. The method of claim 1, further comprising:
determining a second vector including context data for the at least one node,
wherein determining the predicted node type of the vector is further based on the second vector.

4. The method of claim 3, wherein the context data is based on a performing on a tree-based recursion algorithm with respect to parent-child node relationships of the first webpage.

5. The method of claim 1, wherein the machine learning model is configured to estimate a respective node type for each category within a set of webpage categories, and
wherein the predicted node type is based on the estimated respective node types.

6. The method of claim 5, wherein the set of webpage categories includes home, product, cart, category and account creation categories.

7. The method of claim 1, wherein the HTML content of the vector includes HTML code, displayed text, an ID attribute, classname attributes and a list of other attributes corresponding to the at least one node.

8. The method of claim 1, further comprising:
storing an indication of the predicted node type in association with the at least one node.

9. The method of claim 1, wherein the at least one node comprises plural nodes of the first webpage, and
wherein the generating, providing, determining and causing are performed with respect to each one of the plural nodes, to determine zone types for the webpage.

10. A system comprising:
a processor; and
a memory storing instructions that, when executed by the processor, configure the processor to perform operations comprising:
generating, for at least one node a first webpage, a vector including HyperText Markup Language (HTML) content corresponding to the at least one node;
providing the vector as input to a machine learning model, wherein the machine learning model is configured to output a predicted node type based on the vector, the machine learning model having been trained with plural vectors HTML content corresponding to plural nodes of second webpages;

determining, based on the output of the machine learning model, the predicted node type of the vector, to classify the at least one node; and causing, based on classifying the at least one node, display of zoning metrics in association with the at least one node, wherein the zoning metrics are displayed as an overlay corresponding to the at least one node, in association with display of the webpage.

11. The system of claim 10, wherein the at least one node corresponds to a document object model (DOM) corresponding to the first webpage.

12. The system of claim 10, the operations further comprising:
determining a second vector including context data for the at least one node,
wherein determining the predicted node type of the vector is further based on the second vector.

13. The system of claim 12, wherein the context data is based on a performing on a tree-based recursion algorithm with respect to parent-child node relationships of the first webpage.

14. The system of claim 10, wherein the machine learning model is configured to estimate a respective node type for each category within a set of webpage categories, and
wherein the predicted node type is based on the estimated respective node types.

15. The system of claim 14, wherein the set of webpage categories includes home, product, cart, category and account creation categories.

16. The system of claim 10, wherein the HTML content of the vector includes HTML code, displayed text, an ID attribute, classname attributes and a list of other attributes corresponding to the at least one node.

17. The system of claim 10, wherein the at least one node comprises plural nodes of the first webpage, and
wherein the generating, providing, determining and causing are performed with respect to each one of the plural nodes, to determine zone types for the webpage.

18. A non-transitory computer-readable storage medium, the computer-readable storage medium including instructions that when executed by a computer, cause the computer to perform operations comprising:
generating, for at least one node a first webpage, a vector including HyperText Markup Language (HTML) content corresponding to the at least one node;
providing the vector as input to a machine learning model, wherein the machine learn model is configured to output a predicted node type based on the vector, the machine learning model having been trained with plural vectors including HTML content corresponding to plural nodes of second webpages;
determining, based on the output of the machine learning model, the predicted node type of the vector, to classify the at least one node; and
causing, based on classifying the at least one node, display of zoning metrics in association with the at least one node,
wherein the zoning metrics are displayed as an overlay corresponding to the at least one node, in association with display of the webpage.

* * * * *

UNITED STATES PATENT AND TRADEMARK OFFICE
CERTIFICATE OF CORRECTION

PATENT NO. : 11,741,186 B1  
APPLICATION NO. : 17/877672  
DATED : August 29, 2023  
INVENTOR(S) : Frikha et al.

Page 1 of 2

It is certified that error appears in the above-identified patent and that said Letters Patent is hereby corrected as shown below:

On the Title Page

In Column 2, under "Other Publications", Line 7, delete "SUbpath" and insert --Subpath-- therefor In the Specification In Column 3, Line 10, delete "web site." and insert --website.-- therefor In Column 6, Line 28, delete "118" and insert --124-- therefor In Column 7, Line 17, delete "web site" and insert --website-- therefor In Column 7, Line 61, delete "web site" and insert --website-- therefor In Column 8, Line 57, delete "web site" and insert --website-- therefor In Column 9, Line 14, delete "web site," and insert --website,-- therefor In Column 9, Line 39, delete "web site" and insert --website-- therefor In Column 10, Line 49, delete "web site" and insert --website-- therefor In Column 10, Line 51, delete "web site" and insert --website-- therefor In Column 11, Line 37, delete "web site" and insert --website-- therefor In Column 16, Lines 39-40, delete "Done-dimensional" and insert --one-dimensional-- therefor In Column 17, Line 52, delete "(LTSMs)" and insert --(LSTMs)-- therefor Signed and Sealed this  
Third Day of December, 2024

Katherine Kelly Vidal  
*Director of the United States Patent and Trademark Office*

In Column 17, Line 54, delete "TreeLSTM" and insert --Tree-LSTM-- therefor

In Column 22, Line 28, delete "1206," and insert --1214,-- therefor